No. 882,164. PATENTED MAR. 17, 1908.
J. W. PRIDMORE.
REAPING ATTACHMENT FOR MOWERS.
APPLICATION FILED OCT. 9, 1907.
2 SHEETS—SHEET 1.
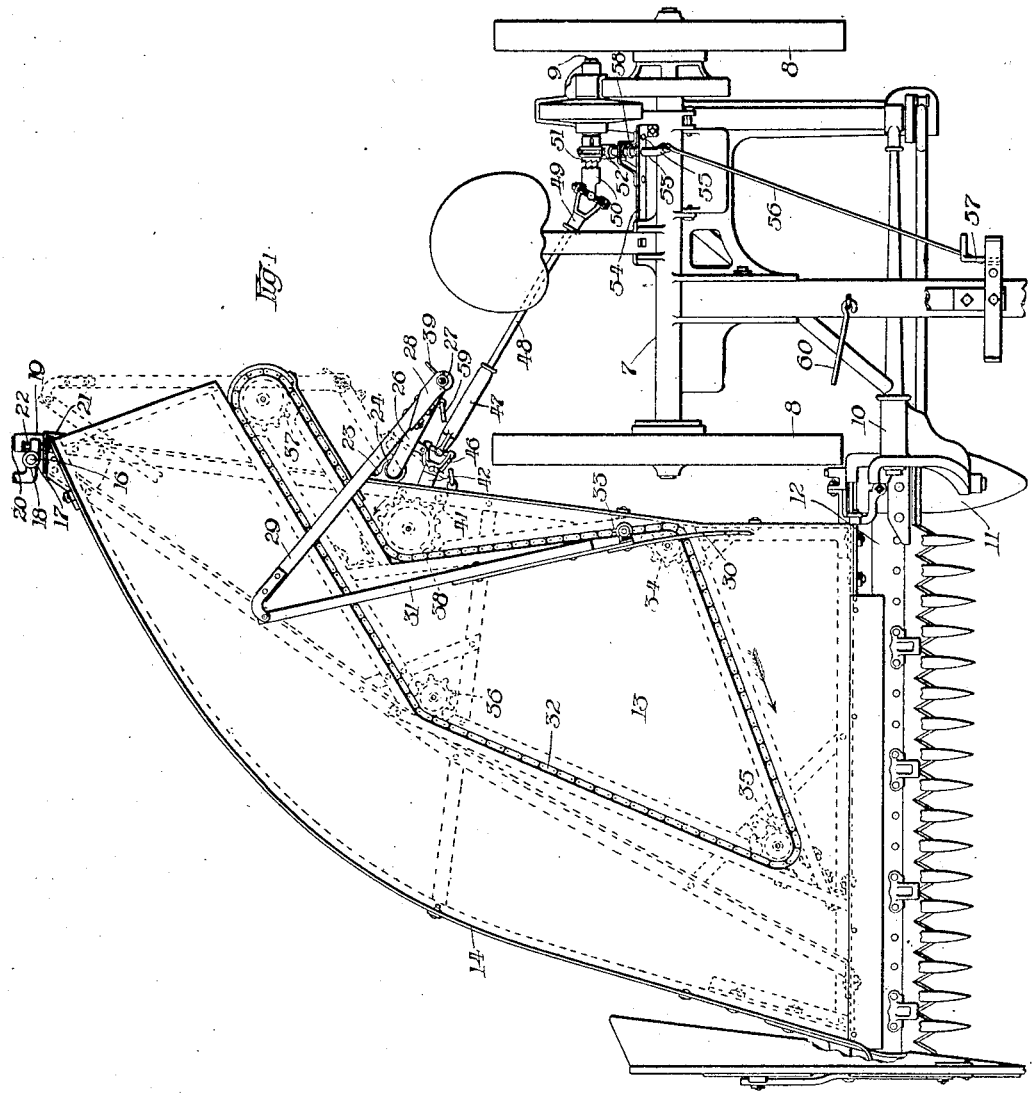
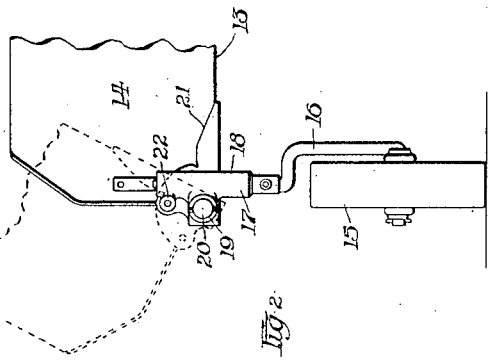
Witnesses:
F. W. Hofmeister
J. N. Daggett
Inventor
John W. Pridmore
By E. W. Burgess
Attorney No. 882,164. PATENTED MAR. 17, 1908.
J. W. PRIDMORE.
REAPING ATTACHMENT FOR MOWERS.
APPLICATION FILED OCT. 9, 1907.
2 SHEETS—SHEET 2.
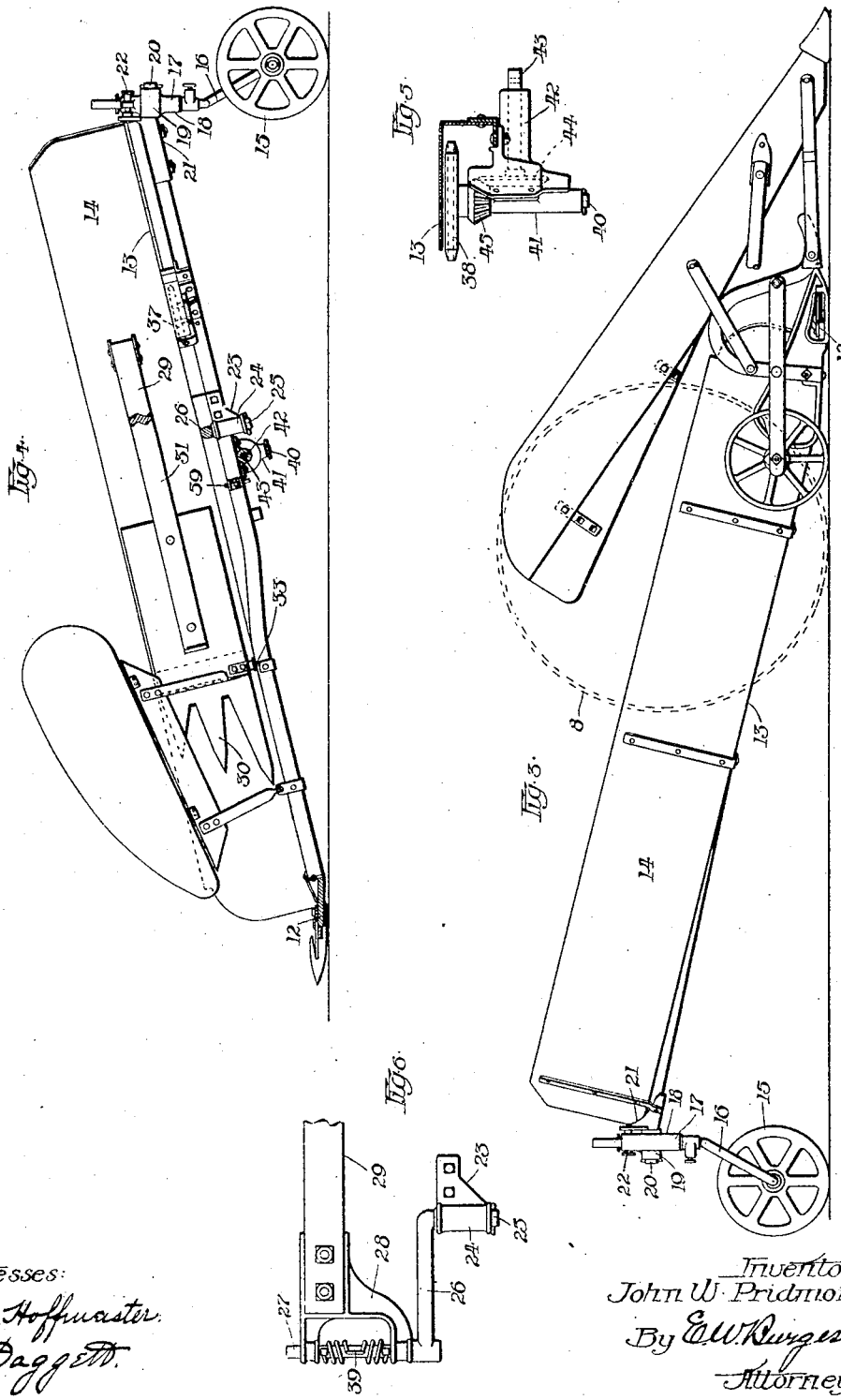
Witnesses:
F. W. Hoffmaster
J. M. Daggett
Inventor
John W. Pridmore
By E. W. Burgess
Attorney

UNITED STATES PATENT OFFICE.

JOHN W. PRIDMORE, OF CHICAGO, ILLINOIS, ASSIGNOR TO INTERNATIONAL HARVESTER COMPANY, A CORPORATION OF NEW JERSEY.

REAPING ATTACHMENT FOR MOWERS.

No. 882,164.　　　　Specification of Letters Patent.　　Patented March 17, 1908.

Application filed October 9, 1907.　Serial No. 396,541.

*To all whom it may concern:*

Be it known that I, JOHN W. PRIDMORE, a citizen of the United States, residing at Chicago, in the county of Cook and State of Illinois, have invented certain new and useful Improvements in Reaping Attachments for Mowers, of which the following is a specification.

My invention relates to reaping attachments for mowers that are designed to receive the grain from the cutting apparatus and deposit it in rear of the machine and out of its path in its succeeding round; its object being to provide an attachment of the above noted character that may be readily attached to an ordinary mower, and one that will operate to deliver the gavels at one side of the path of the cutting apparatus, and under the control of the operator. I attain these objects by the mechanism illustrated in the accompanying drawing, in which—

Figure 1 is a top plan view of a mower having my improved reaping attachment attached thereto; Fig. 2 is a detached detail showing the manner in which the rear end of the attachment is mounted upon the caster-wheel; Fig. 3 is a side elevation of the grainward side of the attachment; Fig. 4 is a side elevation, partly in section, of the stubbleward side of the attachment; Fig. 5 is a detail of the motion transmitting means connected with the gavel delivering mechanism; and Fig. 6 is a detail showing the manner of mounting the platform rake.

The same parts are designated by like reference numerals throughout the several views.

Referring to the drawings, 7 represents the main frame of the mower mounted upon carrying wheels 8, and having a cross shaft 9 in rear thereof, which shaft receives motion from the carrying wheels in a common way.

10 represents the coupling frame, and 11 the inner shoe connected with the coupling frame by means of the usual hinge joint, whereby the cutter-bar 12, secured to the shoe, may be raised to a substantially vertical position relative to the machine.

13 is a grain platform secured to the rear side of the cutter-bar and adapted to rise and fall therewith and to receive the grain from the cutting apparatus. The platform extends in rear of the cutting mechanism with its delivery end in rear of the machine and its grainward side provided with the vertical wall 14.

15 represents a caster-wheel suitably journaled at the lower end of a crank-arm 16, that has its upper end received by a vertical journal bearing 17, forming part of a bracket member 18, said bracket member being provided with a horizontally disposed journal bearing portion 19 adapted to receive the journal 20 forming part of the supporting member 21, that is secured to the rear side of the grain platform; the axis of the journal being substantially coincident with the hinge joint connection between the cutter-bar and coupling frame of the mower; the construction of the associated parts being such as to permit the platform to turn about the horizontal axis of the journal 20 when being raised to a vertical position, and 22 represents a spring pressed bolt mounted on the bracket member 18 and adapted to engage with openings in the part 21 in a manner to secure the parts in operative relation determined by their position of adjustment.

A bracket 23 is secured to the stubbleward side of the grain platform and provided with a vertically arranged journal bearing 24 adapted to receive the lower arm 25 of a double crank member 26, having an upper vertical arm 27. A bracket member 28 is pivotally mounted upon arm 27, and secured to the bracket is one end of a bar 29 that overhangs the grain platform.

30 represents a platform rake having a rearwardly extending arm 31 secured thereto, the rear end of said arm being pivotally connected with the overhanging end of the bar 29.

Motion is transmitted to the rake by means of an endless chain 32 operating in a plane parallel with the surface of the grain platform, the rake being pivotally connected with one of the links 33 thereof. The chain is controlled in an irregular path by means of sprocket wheels suitably journaled upon the frame members of the platform; the location of the sprocket wheels being such that with the rake in the position as illustrated in Fig. 1, and the chain moving in a direction indicated by the arrow, it would be guided around the forward sprocket wheel 34, at the stubbleward side of the platform, then forward and grainward around sprocket wheel 35, then in an angular course rearward and stubbleward toward sprocket wheel 36, then at a different angle relative to the line of draft to the rear sprocket wheel 37, then forward and grainward to sprocket wheel 38, and then in a line approximately parallel with the line of draft of the machine to its original position, the chain in its travel describing an irregular figure having a plurality of sides disposed at varying angles relative to the line of draft of the machine. The chain determines the path of the rake in its cycle of movement and the bar 29, in combination with arm 31, controls the angle thereof as it sweeps the gavel across the platform. When the rake has reached a predetermined limit of its rearward movement and the bar 29 being turned thereby about its axis of movement, the bracket member 28, to which said bar is secured, will contact with a buffer spring 39, secured to arm 27 of the double crank member 26, in a manner to yieldingly restrain a further movement of the bar in the same direction.

Motion is communicated to the chain by means of the sprocket wheel 38, that is mounted upon the upper end of a vertical shaft 40, journaled in a bracket 41, secured to the platform and having a horizontal journal bearing 42 integral therewith, in which is journaled a shaft 43, to which is secured a bevel wheel 44, that meshes with a pinion 45 secured to the vertical shaft 40. A universal coupling member 46 is secured to the opposite end of shaft 43, and said member is suitably connected with one end of a sleeve coupling 47, that is slidably connected with one end of a diagonally arranged shaft 48, and the opposite end of said shaft is connected with the cross-shaft 9 by means of a universal coupling mechanism 49, and a clutch member 50 loosely mounted on shaft 9, and adapted to engage with a sliding clutch member 51, which is splined to the shaft in a common way and provided with an annular groove adapted to receive a clutch shifting fork 52, that is connected with a rocking member 53 mounted in a bracket 54, secured to the frame of the mower, the rocking member being provided with a crank portion 55, to which is connected the rear end of a rod 56, the front end of which rod is connected with a common form of foot lever mechanism 57, suitably mounted upon the tongue of the machine within convenient reach of the operator's foot. By means of the foot lever and its connections the clutch members may be moved into engagement, and 58 represents a spring coiled about the rocking member 53 and operable to disengage the clutch mechanism when the foot lever is released from pressure; the operation of the mechanism being under the control of the operator, who may cause the raking mechanism to be thrown into action at any time to clear the platform of its accumulated load. When the attachment is in operative position the double crank arm 26 is secured against movement by means of a detachable link 59, having one end connected with the platform and its opposite end with the arm 26, near its outer end. When it is desired to place the platform in position for transportation the link 59 is disconnected from the arm and the latter swung rearward and the link again connected with the arm nearer its pivotal connection with the platform, as shown by dotted lines in Fig. 1. The spring pressed bolt 22 being released from engagement with the part 21, the platform and cutter-bar may be raised to a vertical position and secured in a common way by means of the hook 60, connected with the tongue of the machine.

What I claim as my invention, and desire to secure by Letters Patent, is:

1. In a reaping attachment for mowers, and in combination with the cutting apparatus thereof, a platform adapted to be attached in rear of the cutting apparatus and extending in rear of the machine, an endless chain mounted on said platform and adapted to travel substantially parallel with the surface thereof, the path of movement of said chain being in the form of an irregular figure having a plurality of sides disposed at varying angles relative to the line of draft of the machine, a rake pivotally connected with said chain and having a rearwardly extending arm, a rake controlling bar having one end pivotally supported upon the stubbleward side of said platform and its opposite end pivotally connected with the rear end of said arm, said chain being operative to move said rake forward and grainward and then rearward and stubbleward.

2. In a reaping attachment for mowers, and in combination with the cutting apparatus thereof, a platform adapted to be attached in rear of the cutting apparatus and extending in rear of the machine, an endless chain mounted upon said platform and adapted to travel substantially parallel with the surface thereof, the path of movement of said chain being in the form of an irregular figure having a plurality of sides disposed at varying angles relative to the line of draft of the machine, a rake pivotally connected with said chain and having a rearwardly extending arm, a rake controlling bar having one end pivotally supported upon the stubbleward side of said platform and its opposite end pivotally connected with the rear end of said arm, said chain being operative to move said rake forward and grainward and then rearward and stubbleward under the control of said bar, and a buffer spring adapted to contact with said bar when said rake has reached a predetermined limit of its stubbleward movement.

3. In a reaping attachment for mowers, and in combination with the cutting apparatus thereof, said cutting apparatus comprising a cutter bar having a hinge connection with the coupling frame of the machine permitting it to be raised to a substantially vertical position, a platform adapted to be attached in rear of the cutting apparatus and extending in rear of the machine, a casterwheel supporting the rear end of said platform, a crank arm upon which said wheel is journaled, a bracket connected with said platform and adapted to turn about a horizontal axis located above the axis of said wheel upon said crank-arm and substantially coincident with the hinge connection of said cutter bar, said bracket having a vertically arranged journal bearing adapted to receive said crank arm.

4. In a reaping attachment for mowers, and in combination with the cutting apparatus thereof, said cutting apparatus comprising a cutter-bar having a hinge connection with the coupling frame of the machine permitting it to be raised to a substantially vertical position, a platform adapted to be attached in rear of the cutting apparatus and extending in rear of the machine, a casterwheel supporting the rear end of said platform, a crank arm upon which said casterwheel is journaled, a bracket connected with said platform and adapted to turn about a horizontal axis located above the axis of said wheel upon said crank-arm and substantially coincident with the hinge connection of said cutter-bar, said bracket having a vertically arranged journal bearing adapted to receive said crank arm, and means for locking said bracket against rotation about its horizontal axis.

5. In a reaping attachment for mowers, and in combination with the cutting apparatus thereof, said cutting apparatus comprising a cutter-bar having a hinge connection with the coupling frame of the machine permitting it to be raised to a substantially vertical position, a platform adapted to be attached in rear of the cutting apparatus and extending in rear of the machine, said platform being supported in a manner permitting it to be raised with said cutter-bar, a rake adapted to move parallel with the surface of said platform, means for controlling the movement of said rake, said controlling means comprising a bar pivotally connected with said platform, and means for adjusting said pivotal connection in a fore and aft direction.

6. In a reaping attachment for mowers, and in combination with the cutting apparatus thereof, said cutting apparatus comprising a cutter-bar having a hinge connection with the coupling frame of the machine permitting it to be raised to a substantially vertical position, a platform adapted to be attached in rear of the cutting apparatus and extending in rear of the machine, said platform being supported in a manner permitting it to be raised with said cutter-bar, a rake adapted to move parallel with the surface of said platform, means for controlling the movement of said rake, said controlling means comprising a bar pivotally connected with said platform, and means for adjusting said pivotal connection in a fore and aft direction, said adjusting means comprising a double crank-arm having one arm pivotally connected with said platform and its other arm pivotally connected with said bar.

JOHN W. PRIDMORE.

Witnesses:
 LUD HOLLAND-LETZ,
 RAY D. LEE.